United States Patent
Kornblum

(10) Patent No.: US 7,306,418 B2
(45) Date of Patent: Dec. 11, 2007

(54) DEFORMING MEMBER AND CAPTIVE FASTENER RETAINING METHOD

(75) Inventor: Stephen R. Kornblum, Walled Lake, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/950,837

(22) Filed: Sep. 27, 2004

(65) Prior Publication Data

US 2006/0067804 A1     Mar. 30, 2006

(51) Int. Cl.
*F16B 21/18*     (2006.01)
*F16B 39/282*    (2006.01)
*F16B 39/24*     (2006.01)

(52) U.S. Cl. .................. 411/352; 411/399; 411/160; 411/187; 411/957

(58) Field of Classification Search ............... 411/352, 411/396, 538, 531, 542, 957, 998, 339, 353, 411/999, 160, 187
See application file for complete search history.

(56) References Cited

U.S. PATENT DOCUMENTS

| | | | | |
|---|---|---|---|---|
| 240,387 A * | 4/1881 | Cowdy | ........................ | 411/161 |
| 855,195 A * | 5/1907 | Marr | ........................... | 52/463 |
| 1,044,055 A * | 11/1912 | Johnson et al. | .............. | 403/107 |
| 1,301,302 A * | 4/1919 | Nolan | ......................... | 411/531 |
| 1,612,955 A * | 1/1927 | Valberg | ....................... | 411/160 |
| 1,640,650 A * | 8/1927 | Ehrhardt | ..................... | 411/531 |
| 1,742,201 A * | 1/1930 | Drissner | ..................... | 411/396 |
| 1,773,410 A * | 8/1930 | Selah | .......................... | 411/378 |
| 1,854,730 A * | 4/1932 | Bell | ............................ | 292/251 |
| 1,946,063 A * | 2/1934 | Dodge | ......................... | 285/39 |
| 1,968,516 A * | 7/1934 | Dieter | ........................ | 411/399 |
| 1,969,796 A * | 8/1934 | Hoke | ....................... | 411/366.1 |
| 1,976,077 A * | 10/1934 | Lindburg et al. | ........... | 411/187 |
| 1,982,076 A * | 11/1934 | Sphan | ........................ | 411/133 |
| 2,054,187 A * | 9/1936 | Almdale | ...................... | 219/93 |
| 2,056,688 A * | 10/1936 | Peterka et al. | .............. | 411/399 |
| 2,092,684 A * | 9/1937 | Uhl | ............................ | 403/281 |
| 2,147,209 A * | 2/1939 | Olson | ......................... | 411/187 |
| 2,217,951 A * | 10/1940 | Hosking | ..................... | 411/187 |
| 2,229,892 A * | 1/1941 | Hosking | ..................... | 411/187 |
| 2,752,814 A * | 7/1956 | Iaia | ............................ | 411/542 |
| 2,761,484 A * | 9/1956 | Sternick et al. | ............. | 411/353 |
| 2,778,399 A * | 1/1957 | Mroz | ......................... | 411/161 |
| 2,862,040 A * | 11/1958 | Curran | ........................ | 174/51 |
| 2,866,372 A * | 12/1958 | Fisher | ......................... | 24/292 |
| 3,106,413 A * | 10/1963 | Hamlin et al. | .............. | 285/212 |

(Continued)

FOREIGN PATENT DOCUMENTS

DE     29711296 U1 *  8/1997

*Primary Examiner*—Katherine Mitchell

(57) ABSTRACT

A fastener is retained within an opening of a workpiece by deforming a portion of an edge of the opening inwardly to prevent removal of the fastener. A deforming member associated with a head of the fastener includes a body having a clamping surface extending radially form a central axis. A wedge-like deforming element has a deforming member and having a deforming face angled axially and radially outward from the clamping surface. The deforming element, when pressed against a malleable edge of the workpiece, deforms at least a portion of the edge into the fastener opening thereby creating a stop which reduces the diameter of the opening and mechanically retains the fastener therein. The deforming member may be formed as a separate washer assembled on the fastener or may be made integral with the fastener head.

6 Claims, 2 Drawing Sheets

U.S. PATENT DOCUMENTS

| | | | | |
|---|---|---|---|---|
| 3,118,718 A * | 1/1964 | Babey | | 439/737 |
| 3,156,281 A * | 11/1964 | Demi | | 411/147 |
| 3,168,321 A * | 2/1965 | Milton | | 277/637 |
| 3,186,284 A * | 6/1965 | Bennett | | 83/623 |
| 3,194,292 A * | 7/1965 | Borowsky | | 411/155 |
| 3,196,919 A * | 7/1965 | Poupitch | | 411/155 |
| 3,209,806 A * | 10/1965 | Currier et al. | | 411/361 |
| 3,209,807 A * | 10/1965 | Ryner | | 411/361 |
| 3,221,794 A * | 12/1965 | Acres | | 411/353 |
| 3,241,422 A * | 3/1966 | Heimovics | | 411/371.1 |
| 3,377,039 A * | 4/1968 | Hayes | | 410/112 |
| 3,389,734 A * | 6/1968 | Gutshall | | 411/185 |
| 3,399,705 A * | 9/1968 | Breed et al. | | 411/180 |
| 3,446,508 A * | 5/1969 | Mayer | | 277/639 |
| 3,502,130 A * | 3/1970 | Bulent | | 411/361 |
| 3,571,904 A * | 3/1971 | Gulistan | | 29/443 |
| 3,614,799 A * | 10/1971 | Bulent | | 470/50 |
| 3,638,700 A * | 2/1972 | Onufer | | 411/285 |
| 3,711,138 A * | 1/1973 | Davis | | 403/408.1 |
| 3,730,563 A * | 5/1973 | Hanback et al. | | 285/114 |
| 3,761,867 A * | 9/1973 | Churla | | 439/413 |
| 3,770,037 A * | 11/1973 | Ernest | | 411/184 |
| 3,777,796 A * | 12/1973 | Takano | | 411/134 |
| 3,782,436 A * | 1/1974 | Steiner | | 411/184 |
| 3,862,458 A * | 1/1975 | Stanaitis | | 470/4 |
| 3,967,669 A * | 7/1976 | Egner | | 411/184 |
| 4,103,725 A * | 8/1978 | Abe | | 411/160 |
| 4,157,725 A * | 6/1979 | Stanaitis | | 411/147 |
| 4,292,007 A * | 9/1981 | Wagner | | 411/156 |
| 4,462,730 A * | 7/1984 | Knohl | | 411/371.1 |
| 4,466,246 A * | 8/1984 | Furuta et al. | | 60/547.1 |
| 4,518,294 A * | 5/1985 | Barth | | 411/188 |
| 4,543,763 A * | 10/1985 | Ernst et al. | | 52/698 |
| 4,583,366 A * | 4/1986 | Tsubouchi et al. | | 60/547.1 |
| 4,689,958 A * | 9/1987 | Arino et al. | | 60/547.1 |
| 4,726,189 A * | 2/1988 | Arino et al. | | 60/547.1 |
| 4,764,066 A * | 8/1988 | Terrell et al. | | 411/187 |
| 4,779,326 A * | 10/1988 | Ichikawa | | 29/520 |
| 4,781,503 A * | 11/1988 | Bogel | | 411/358 |
| 4,797,022 A * | 1/1989 | Crigger | | 403/408.1 |
| 4,820,076 A * | 4/1989 | Rossigno | | 403/284 |
| 4,827,756 A * | 5/1989 | Crigger | | 72/377 |
| 4,854,438 A * | 8/1989 | Weissenberger et al. | | 192/107 R |
| 4,858,880 A * | 8/1989 | Durand | | 248/635 |
| 4,907,927 A * | 3/1990 | Choiniere | | 411/368 |
| 4,966,512 A * | 10/1990 | Takaku | | 411/181 |
| 4,987,714 A * | 1/1991 | Lemke | | 52/410 |
| 5,094,579 A * | 3/1992 | Johnson | | 411/107 |
| 5,154,559 A * | 10/1992 | Wagner | | 411/107 |
| 5,201,627 A * | 4/1993 | Biedenbach | | 411/531 |
| 5,219,255 A * | 6/1993 | Hussain et al. | | 411/432 |
| 5,244,325 A * | 9/1993 | Knohl | | 411/353 |
| 5,255,647 A * | 10/1993 | Kiczek | | 123/195 C |
| 5,388,940 A * | 2/1995 | Herren | | 411/107 |
| 5,393,183 A * | 2/1995 | Hinton | | 411/432 |
| 5,462,395 A * | 10/1995 | Damm et al. | | 411/107 |
| 5,487,633 A * | 1/1996 | Roberts | | 411/387.3 |
| 5,489,177 A * | 2/1996 | Schmidt, Jr. | | 411/369 |
| 5,557,897 A * | 9/1996 | Kranz et al. | | 52/410 |
| 5,711,711 A * | 1/1998 | Schmidt, Jr. | | 470/41 |
| 5,879,119 A * | 3/1999 | Robinson | | 411/399 |
| 5,975,821 A * | 11/1999 | Kue | | 411/533 |
| 6,059,503 A * | 5/2000 | Johnson | | 411/353 |
| 6,082,942 A * | 7/2000 | Swick | | 411/368 |
| 6,173,969 B1 * | 1/2001 | Stoll et al. | | 277/630 |
| 6,254,326 B1 * | 7/2001 | Palm | | 411/411 |
| 6,309,157 B1 * | 10/2001 | Amann et al. | | 411/353 |
| 6,644,903 B1 * | 11/2003 | Arand | | 411/352 |
| 6,679,666 B2 * | 1/2004 | Mizuno et al. | | 411/353 |
| 6,685,409 B2 * | 2/2004 | Braun et al. | | 411/353 |
| 6,893,196 B2 * | 5/2005 | Wille | | 411/34 |
| 2001/0031188 A1 | 10/2001 | Iwatsuki | | 411/180 |
| 2002/0009350 A1 | 1/2002 | Radtke | | 411/353 |
| 2002/0009351 A1 * | 1/2002 | Bondarowicz et al. | | 411/353 |
| 2002/0106257 A1 * | 8/2002 | Braun et al. | | 411/353 |
| 2002/0106258 A1 * | 8/2002 | Braun et al. | | 411/353 |
| 2002/0150443 A1 * | 10/2002 | Johnson et al. | | 411/353 |
| 2002/0197130 A1 * | 12/2002 | Ozawa et al. | | 411/353 |
| 2003/0053885 A1 * | 3/2003 | Hartmann et al. | | 411/353 |
| 2003/0108401 A1 * | 6/2003 | Agha et al. | | 411/353 |
| 2003/0108402 A1 * | 6/2003 | Agha et al. | | 411/353 |
| 2003/0194292 A1 * | 10/2003 | Deeg et al. | | 411/353 |
| 2003/0194293 A1 * | 10/2003 | Johnson et al. | | 411/353 |
| 2004/0222593 A1 * | 11/2004 | Metschke | | 277/353 |

* cited by examiner

DEFORMING MEMBER AND CAPTIVE FASTENER RETAINING METHOD

TECHNICAL FIELD

This invention relates to captive fasteners and, more particularly, to a deforming member for use in retaining a fastener within an opening of a workpiece.

BACKGROUND OF THE INVENTION

Retainable fasteners currently utilize metal clips or elastomer-type retention devices for retaining a fastener within a fastener opening of a workpiece. Metal clips are impractical for certain applications. Elastomer-type retention devices often have low melting or flash points making them unsuitable for retaining fasteners in high temperature applications.

SUMMARY OF THE INVENTION

The present invention provides a deforming member for use in retaining a fastener within an opening of a workpiece.

In a first embodiment, the deforming member has a body in the form of a hardened annular washer having a clamping surface extending radially from a central axis and a fastener receiving opening extending through the washer and centered on the central axis. At least one wedge-like deforming element extends from the clamping surface of the washer and has a deforming face angled radially and axially outward from the axis and the body clamping surface. The deforming element should be configured so that when the deforming element and the clamping surface are pressed against a malleable edge portion of a fastener opening, the wedge deforms at least a portion of the edge into the fastener opening and reduces a diameter of the fastener opening to create a stop which operates to mechanically retain a shank portion of a fastener within the fastener opening.

Alternatively, the wedge-like deforming element of the washer may extend annularly around the central axis to form an annular wedge operable to deform an entire peripheral edge of a fastener opening for retaining a fastener therein.

In another embodiment, the deforming member is integral with a head at one end of a fastener having a body centered on an axis including a fastening portion at another end and a reduced diameter portion between the ends adjacent the head. A deforming element extends annularly around the axis along a lower surface of the head to form an annular wedge-like deforming element operable to deform an entire peripheral edge of a fastener opening for retaining a fastener therein.

These and other features and advantages of the invention will be more fully understood from the following description of certain specific embodiments of the invention taken together with the accompanying drawings.

DESCRIPTION OF THE PREFERRED EMBODIMENT

Figure 1:
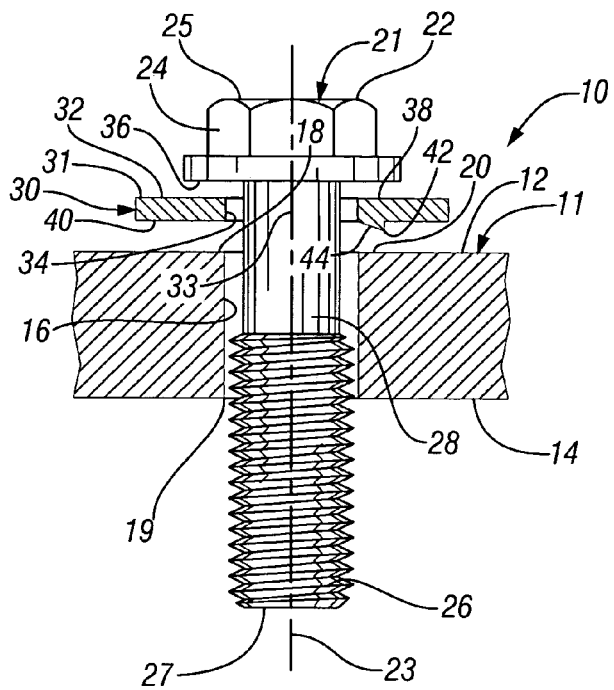
FIG. 1 is cross-sectional view of a fastener assembly inserted into a fastener opening of a workpiece according to a first embodiment of the present invention.
Figure 2:
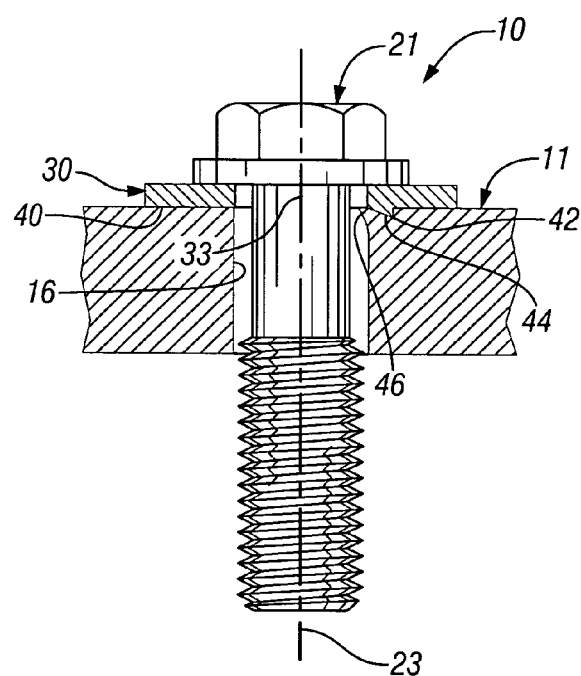
FIG. 2 is a view similar to FIG. 1 showing the fastener retained within the opening.

Referring first to FIGS. 1 and 2 of the drawings in detail, numeral 10 generally indicates an assembly including a workpiece 11 adapted to be fastened to another component, not shown. The workpiece 11 may be formed of ductile material and may be in the form of a flange, or a heavier body having upper and lower (or outer and inner) surfaces 12, 14. At least one fastener opening 16 extends through the workpiece 11, between the upper and lower surfaces 12, 14. The fastener opening 16 is further defined by upper and lower edges 18, 19 wherein the upper edge 18 has at least an edge portion 20, which is malleable and able to be deformed. The upper (outer) surface 12 of the workpiece 11 may be flat or otherwise configured, but at least an area of the workpiece extending outward from and generally adjacent to each fastener opening will preferably be essentially flat, without recesses or chambers. Also, the fastener opening area is formed as a unitary one piece component and is free from separate sleeves or bushing elements.

A fastener 21 adapted to be received in the fastener opening 16 includes a body 22 centered on an axis 23. The fastener 21 has a head 24 at one end 25, a fastening portion 26 at another end 27 and a reduced diameter portion 28 between the ends 25, 27. A deforming member 30 in the form of a hardened washer 31 having a body 32, extending radially from a central axis 33 coincident with axis 23. The body 32 has a central opening 34 and is received on the reduced diameter portion 28 of the fastener 21 adjacent a lower surface 36 of the head 24. The body 32 has a generally flat outer (upper) surface 38.

The body 32 of the washer 31 also has a (lower) clamping surface 40 generally parallel to the outer surface 38 of the washer: A wedge like deforming element 42 extends from the (lower) clamping surface 40 of the body 30 (washer 32) and has a deforming face 44 angled radially and axially outward from the central axis 33 and the lower clamping surface 40, respectively, of the deforming member body 30. The deforming face terminates outwardly at a radially outer face extending axially a fixed distance outward from the clamping surface 40 and parallel with or sloped outward from the axis, thereby forming an angle with the deforming face not greater than an angle of the deforming face relative to the axis. Thus, the outer face of the deforming element 42 is oriented so as not to act as a deforming face and does not require a chamfer or recess in the upper (outer) surface 12 to avoid radially outward deformation of the workpiece material. The deforming element 42 is positioned on the lower clamping surface 40 of the washer 31 so as to engage the malleable edge portion 20 of the upper edge 18 of the workpiece fastener opening 16 when the fastener 21 carrying the washer 31 is inserted into the fastener opening 16.

The fastener 21 is retained within the fastener opening 16 of the workpiece 11 by first inserting the fastening portion 26 and the reduced diameter portion 28 through opening 34 in washer 31 and then into the fastener opening 16 until the deforming element 42 engages the upper surface 12 of the workpiece 11 and the lower surface 36 of the fastener head 24 engages the upper/outer surface 38 of the washer 31. The fastener 21 and washer 31 are then pressed axially downward against the upper surface 12 of the workpiece 11 so that the deforming face 44 of the deforming element 42 is pressed into the malleable edge portion 20 of the workpiece fastener opening 16. The clamping surface 40 extends annularly and/or radially beyond the deforming element 42 to engage the upper surface 12 of the workpiece 11 at a predetermined deforming element depth. If desired, the depth of the deforming element is selected to limit the inward deformation of the upper edge portion 20 so that the fastener 21 is loosely retained in the fastener opening 16. The pressing step may be accomplished using a suitable force transmitting device, such as a hydraulic press.

Pressing the deforming element 42 into the upper surface 12 of the workpiece 11 locally deforms inward the edge portion 20 toward the center of the fastener opening 16 to reduce a diameter of the opening adjacent to the reduced diameter portion 28 of the fastener 21. The deformed edge creates a stop 46, which in effect reduces the diameter of the fastener opening 16 and mechanically retains the fastener.

Once the fastener 21 is retained within the opening 16 of the workpiece 11, the workpiece and the fastener may be transported as an assembly, as shown in FIG. 2. At a later time, the fastener 21 retained within the workpiece 11 may be used to join the workpiece 11 with another component, not shown.

If the fastening portion 26 of the fastener 21 is threaded, as a conventional screw or bolt, the axial extension of the deforming element 42 below the clamping surface 40 is preferably sized to control deformation of the edge portion 20 to loosely retain the fastener in the opening 16 but allow its free rotation later for connecting the workpiece 11 with another component. However, for other types of fasteners, such as friction or bayonet connection, it may be desired to deform enough of the malleable edge 20 to clamp the fastener firmly into the workpiece 11, so that a greater extension of the deforming element 42 may be required.

The extension dimension of the deforming element 42 needed to hold a fastener 21 in loose assembly could also vary due to the angular extent of the deforming element. In FIGS. 1 and 2, a single deforming element 42 is illustrated. However, multiple separate deforming elements 42 annularly spaced around the axis 33 would form multiple deforming edges around the opening 16 and retain the fastener 21 with smaller stops 46 spaced around the opening edge. An annular deforming element as described below could be even more effective.

Figure 3:
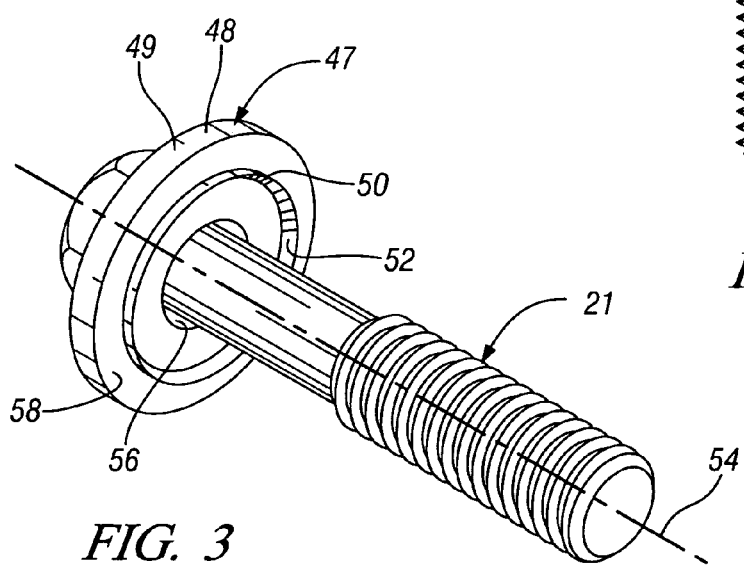
FIG. 3 is a pictorial view of a fastener assembly according to a second embodiment of the present invention.
Figure 4:
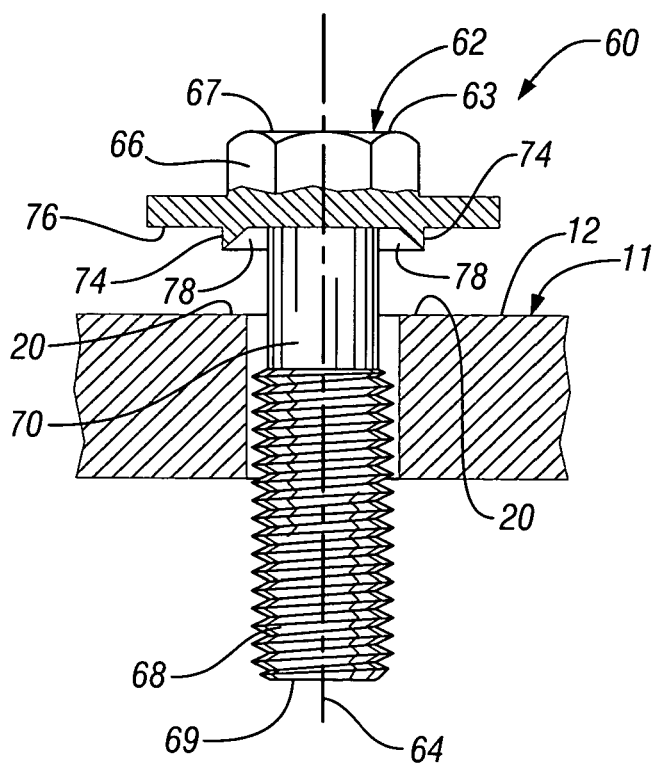
FIG. 4 is a cross-sectional view of a fastener with integral deforming element inserted into a fastener opening of a workpiece according to a second embodiment of the present invention.
Figure 5:
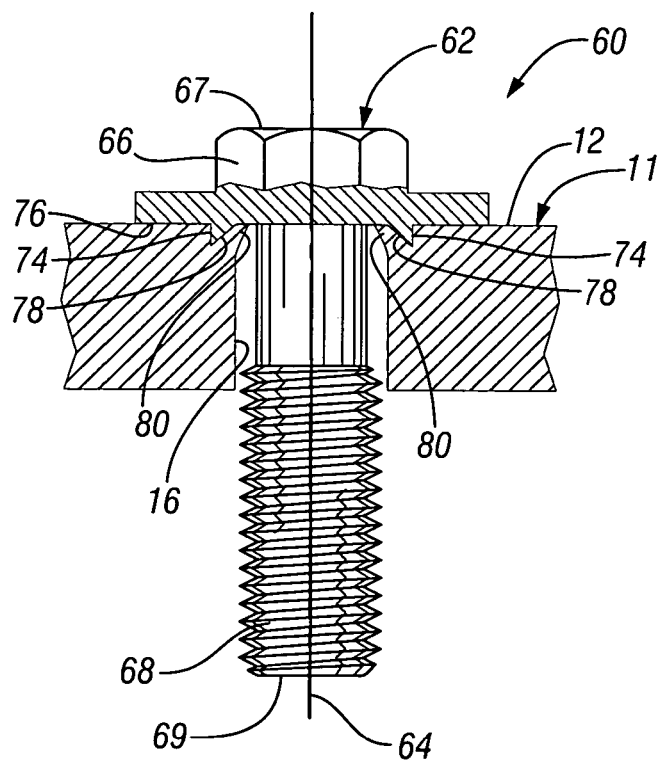
FIG. 5 is a view similar to FIG. 4 showing the fastener retained within the opening.

It should be understood that features of the embodiment of FIGS. 1 and 2 pertaining to an outer face of the deforming element 42 being oriented parallel to the axis 33 or sloped outward from the (lower) clamping surface apply equally to the corresponding deforming elements disclosed in FIG. 3 and to those in FIGS. 4 and 5. Similarly, the previously described features in FIGS. 1 and 2 of the generally flat surfaces of the workpiece adjacent to the fastener openings being free of chambers or recesses and the material of these workpiece locations being unitary one piece portions without separate sleeves or the like are also applicable to the other embodiments of FIG. 3 and FIGS. 4 and 5.

FIG. 3 illustrates an alternative deforming member 47, in the form of a hardened washer 48 having a body 49 and similar to washer 31. It differs, however, in the use of a single annular wedge-like deforming element 50 having an annular deforming face 52 extending radially outward from a central axis 54 and opening 56 and axially outward (downward) from a radially extending annular clamping surface 58.

The deforming member 47 operates similarly to washer 31 in that the washer 47 is received on the reduced diameter portion 28 of the fastener 21 and is used in the same manner to loosely capture the fastener 21 an hold it in assembly with a workpiece 11. This completely deforms the edge 18 of the workpiece 11 toward the center of the fastener opening 16 to reduce the diameter of the opening around the reduced diameter portion 28 of the fastener 21. The deformed edge creates an annular stop, which in effect reduces the diameter at the upper edge of the fastener opening 16 and mechanically retains the fastener 21, as previously discussed.

FIGS. 4 and 5 show an assembly 60 having the deforming member integrated into a head of a fastener 62, similar to fastener 21. The fastener 62 is formed as a body 63 having an axis 64 with a head 66 at one end 67, a fastening portion 68 at another end 69 and a reduced diameter portion 70 between the ends 67, 69. A wedge-like deforming element 74 extends annularly around a lower clamping surface 76 of the head 66 to form an annular deforming element 74. The deforming element 74 has a deforming face 78 angled radially and axially outward from the axis 64 and the lower clamping surface 76 of the head 66. The annular shape of the deforming element 74 operates to deform an annular malleable edge portion 20 defining a fastener opening 16 to create a radially extending annular stop within the opening and thereby reduce the diameter of the opening 16 to retain the fastening portion 68 and the reduced diameter portion 70 of the fastener 62 within the opening.

The fastener 62 is retained within the opening 16 of a workpiece 11 by first inserting the fastening portion 68 and the reduced diameter portion 70 into the fastener opening 16 until the deforming element 74 engages the upper surface 12 of the workpiece 11. The fastener 62 is then pressed axially downward against the upper surface 12 of the workpiece 11 until the lower clamping surface 76 engages the upper surface 12 of the workpiece 11, so that the deforming element 74 is pressed into the malleable edge 20 of the workpiece 11 along the complete upper edge 18. This deforms the complete annular edge 18 of the workpiece 11 toward the center of the fastener opening 16, creating a radial stop 80, which reduces the diameter of the fastener opening 16 and mechanically retains the fastener 62, as previously discussed.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. An interim assembly of a workpiece with at least one loosely retained fastener adapted for subsequent mounting of the assembly to a separate component by attachment of the fastener, the assembly comprising:

a workpiece having an outer surface and at least one fastener opening through the workpiece and partially defined by a malleable edge portion of the workpiece;

a fastener centered on an axis and having a head at one end, a fastening portion on another end, and a reduced diameter portion between the ends, the fastening and reduced diameter portions being received in the fastener opening; and a radial clamping surface associated with the head and surrounding the reduced diameter portion, the clamping surface having a wedge-shaped deforming element with a deforming face which extends radially and axially outward at an acute angle from the axis to adjoin a radially outer face, which extends axially a fixed distance outward from the clamping surface, the outer face forming an acute angle with the deforming face not greater than the acute angle of the deforming face relative to the axis;

the workpiece including a stop made by inwardly deforming, with the deforming element, part of the malleable edge portion of the workpiece into the fastener opening sufficiently to block removal of the fastening portion of the fastener from the fastener opening while loosely retaining the fastener in the fastener opening to permit subsequent attachment of the fastener to said separate component;

wherein an area of the outer surface of the workpiece, extending outward from and adjacent to the fastener opening, is generally flat for engagement by the radial clamping surface and the wedge shaped deforming element, to limit inward deformation of the malleable edge portion of the workpiece to a predetermined amount while avoiding any substantial outward deformation of the workpiece by the deforming element;

the radial clamping surface and the deforming element comprise a deforming member having an outer surface generally parallel with the clamping surface and engagable by the force transmitting device for deforming the edge portion of the workpiece; and wherein the deforming member is a washer with a fastener receiving opening therethrough and centered on the axis.

2. The invention of claim 1 wherein the clamping surface includes a plurality of annularly spaced deforming elements.

3. The invention of claim 1 wherein the wedge-shaped deforming element extends annularly around the axis.

4. An interim assembly of a workpiece with at least one loosely retained fastener adapted for subsequent mounting of the assembly to a separate component by attachment of the fastener, the assembly comprising:

a workpiece having an outer surface and at least one fastener opening through the workpiece and partially defined by a malleable edge portion of the workpiece;

a fastener centered on an axis and having a head at one end, a fastening portion on another end, and a reduced diameter portion between the ends, the fastening and reduced diameter portions being received in the fastener opening; and a radial clamping surface associated with the head and surrounding the reduced diameter portion, the clamping surface having a wedge-shaped deforming element with a deforming face which extends radially and axially outward at an acute angle from the axis to adjoin a radially outer face which extends axially a fixed distance outward from the clamping surface, the outer face forming an angle with the deforming face not greater than the acute angle of the deforming face relative to the axis;

the workpiece including a stop made by inwardly deforming, with the deforming element, part of the malleable edge portion of the workpiece into the fastener opening sufficiently to block removal of the fastening portion of the fastener from the fastener opening while loosely retaining the fastener in the fastener opening to permit subsequent attachment of the fastener to said separate component;

wherein an area of the outer surface of the workpiece, extending outward from and adjacent to the fastener opening, is generally flat for engagement by the radial clamping surface and the wedge shaped deforming element, to limit inward deformation of the malleable edge portion of the workpiece to a predetermined amount while avoiding any substantial outward deformation of the workpiece by the deforming element; and wherein the radial clamping surface is formed on a washer with a fastener receiving opening through the washer and centered on the axis and the washer is engagable by the fastener head during subsequent attachment of the fastener.

5. The invention of claim 4 wherein the workpiece is a panel formed as a unitary one piece component.

6. The invention of claim 5 wherein the fastener opening is free from separate sleeve or bushing elements.

* * * * *